US008663572B2

(12) United States Patent
Ichiki

(10) Patent No.: US 8,663,572 B2
(45) Date of Patent: Mar. 4, 2014

(54) MICRO PLASMA JET GENERATOR

(75) Inventor: Takanori Ichiki, Tsurugashima (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 1458 days.

(21) Appl. No.: 10/590,969

(22) PCT Filed: Jul. 22, 2004

(86) PCT No.: PCT/JP2004/010388
§ 371 (c)(1),
(2), (4) Date: Jan. 5, 2007

(87) PCT Pub. No.: WO2005/091687
PCT Pub. Date: Sep. 29, 2005

(65) Prior Publication Data
US 2008/0063576 A1 Mar. 13, 2008

(30) Foreign Application Priority Data
Mar. 17, 2004 (JP) ................................ 2004-076940

(51) Int. Cl.
*B01J 19/08* (2006.01)

(52) U.S. Cl.
USPC ............. 422/186.29; 422/186.04; 118/723 I; 118/723 E; 361/230; 204/164

(58) Field of Classification Search
USPC ........................ 422/186.29, 186.04; 204/164; 118/723 E, 723 I; 362/230
See application file for complete search history.

(56) References Cited

U.S. PATENT DOCUMENTS

| | | | | |
|---|---|---|---|---|
| 5,669,975 A * | 9/1997 | Ashtiani | .................... | 118/723 I |
| 6,474,258 B2 * | 11/2002 | Brcka | ......................... | 118/723 I |
| 2001/0047760 A1 * | 12/2001 | Moslehi | ...................... | 118/723 I |

FOREIGN PATENT DOCUMENTS

| | | |
|---|---|---|
| JP | 2002-094221 A | 3/2002 |
| JP | 2002-257785 A | 9/2002 |
| JP | 2003-234335 A | 8/2003 |

OTHER PUBLICATIONS

Yin et al, "Miniaturization of Inductively coupled plasma sources", IEEE Transactions on Plasma Science. vol. 27, No. 5, 1999, p. 1516-1524.*
Ichiki et al, "An atmospheric pressure micro plasma jet source for the optical emission spectroscopic analysis of liquid sample", Plasma Source Sci. Technol., 12(2003) S16-S 20.*
Minayeva et al "Emission psectroscopy using a microfabricated inductively coupled plasma on a chip", I. Anal. At. Spetrom., 2002 17, p. 1103-1107.*

* cited by examiner

*Primary Examiner* — Xiuyu Tai
(74) *Attorney, Agent, or Firm* — Birch, Stewart, Kolasch & Birch, LLP

(57) ABSTRACT

The present invention provides a microplasma jet generator capable of stably generating a microplasma jet in a microspace at atmospheric pressure with low electric power. The microplasma jet generator is driven with a VHF power supply to generate an inductively coupled microplasma jet and includes a substrate, a micro-antenna disposed on the substrate, and a discharge tube located close to the micro-antenna. The micro-antenna has a flat meandering shape with plural turns.

18 Claims, 5 Drawing Sheets

MICRO PLASMA JET GENERATOR

TECHNICAL FIELD

The present invention relates to microplasma jet generators and particularly relates to a microplasma jet generator which stably generates a microplasma jet at atmospheric pressure, which is useful in subjecting a predetermined region of a workpiece to surface treatment or processing such as cutting, etching, or film deposition, and which is suitable for a micro total analysis system (hereinafter referred to as a "μTAS").

BACKGROUND ART

Plasma jets have been conventionally used to subject workpieces to surface treatment or processing such as cutting, etching, or film deposition and also used in various fields such as the high-temperature treatment of hazardous substances.

For such plasma jet uses, a known method using direct-current arc discharge is used to generate a fine plasma jet with a diameter of 2 mm or less. Such a method has various problems that electrodes are worn, reactive gas cannot be used, and workpieces are limited to conductors.

Microplasma jet generators have been recently attracting much attention because the microplasma jet generators can be used for practical applications such as plasma display panels (PDPs). Furthermore, it has been attempted to apply the microplasma jet generators to analyzers for chemical or biochemical analysis and process systems for processing or surface-treating microchips for use in micro-devices.

In the field of chemical or biochemical analysis in particular, a novel μTAS for performing high-throughput analysis is being intensively investigated. In the μTAS, the following system and method are used in combination: a flow analysis system that includes a silicon, glass, or plastic chip having micro-grooves with a width of several ten micrometers so as to isolate a trace amount of a substance at high speed by gas chromatography (GC) or micro-capillary electrophoresis (μCE) and an on-chip high-sensitivity detection method such as laser-induced fluorescence detection or electrochemical analysis using micro-electrodes. It is expected to use the μTAS for various applications such as gene analysis, medical examination, and pharmaceutical development.

For bench-top analyzers, the following method has been recently developed: a high-throughput, ultra high-sensitivity detection method using a separation technique such as capillary electrophoresis in combination with inductively coupled plasma optical emission spectroscopy (ICP-OES) or ICP mass spectroscopy that is a known technique for analyzing elements with extremely high sensitivity. Therefore, there is an idea that high-density microplasma is generated on a glass chip or another chip, which is incorporated in the μTAS, which is used for a high-sensitivity detection module.

A. Manz et al. reported the first microplasma chip for analysis in 1999, the chip being incorporated in a μTAS for detecting an atom or a molecule by GC (gas chromatography). They generated a helium DC glow discharge in a microspace, formed in a glass chip, having a width of 450 μm, a depth of 200 μm, and a length of 2000 μm at a pressure of about 17 kPa with an electric power of 10 to 50 mW and estimated the detection limit of methane to be 600 ppm. Since a cathode was sputtered under such vacuum conditions, the discharge was discontinued within two hours. Thereafter, they reported that the discharge was continued for 24 hours at atmospheric pressure.

The first reported microplasma chip, equipped with no electrode, operating at atmospheric pressure is a 2.45 GHz microwave discharge chip including a micro strip antenna. In the discharge chip, a discharge with a length of 2 to 3 cm is generated in a discharge chamber having a depth of 0.9 mm, a width of 1 mm, and a length of 90 mm with a power of 10 to 40 W and the detection limit of mercury vapor is 10 ng/ml.

Since it is difficult to stably generate high-density plasma in a microspace with a small electric power, it has been considered to be impossible to perform high-resolution microanalysis by generating microplasma in a μTAS chip.

In such circumstances, the inventor has proposed a μTAS using a VHF-driven inductively-coupled microplasma source and succeeded in developing high-resolution microanalysis (Patent Document 1). With reference to FIG. 10, the VHF-driven inductively-coupled microplasma source disclosed in Patent Document 1 is a microplasma chip 110 including a discharge tube 103 disposed in a center region of a 30 mm square substrate 101 made of quartz and a one-turn flat antenna 102. The microplasma chip 110 is driven with a VHF power supply. A plasma gas 104 is introduced into one end of the discharge tube 103 and a microplasma jet 105 is discharged from the other end.

Patent Document 1: Japanese Unexamined Patent Application Publication No. 2002-257785 (Claims, FIG. 1, and so on).

DISCLOSURE OF INVENTION

Problems to be Solved by the Invention

High-resolution microanalysis can be performed with a μTAS using a VHF-driven inductively-coupled microplasma source disclosed in Patent Document 1. The performance of a microplasma jet generator needs to be enhanced because of its usefulness.

It is an object of the present invention to provide a microplasma jet generator capable of stably generating a microplasma jet in a microspace at atmospheric pressure with low electric power.

Means for Solving the Problems

In order to solve the above problems, the present invention provides a microplasma jet generator, driven with a VHF power supply, for generating an inductively coupled microplasma jet. The microplasma jet generator includes a substrate, a micro-antenna disposed on the substrate, and a discharge tube located close to the micro-antenna. The micro-antenna has a flat meandering shape with plural turns.

Furthermore, the present invention provides a method for generating a microplasma jet. The method includes introducing plasma gas into the microplasma jet generator at a flow rate of 0.05 to 5 slm and applying a VHF wave to the micro-antenna.

In the present invention, a high-density plasma jet can be stably generated with low electric power in such a manner that a VHF band suitable for trapping a number of ions and electrons in a narrow discharge tube is used and an electric power is applied to plasma gas by an induction coupling method using an induced electric field generated by a current flowing in an antenna without using a capacitance coupling method for accelerating electrons with a static electric field.

Advantages

According to a generator and method of the present invention, a microplasma jet with extremely high density can be stably generated at atmospheric pressure with a small electric power of several ten watts because the power density of a microplasma section increases in inverse proportion to the volume of a discharge.

The electric power to drive the generator, which is compact, is one tenth or less of that to drive a bench-top generator, which is usually driven with an electric power of about 1 kW. Therefore, a compact high-frequency power supply can be used to drive the generator. This is advantageous for weight reduction. Furthermore, the consumption of gas is extremely low and the generator needs no water-cooling unit; hence, a system including the generator is portable. By the use of such a compact system, a fine region can be subjected to surface-treatment or processing such as etching or film deposition.

BEST MODE FOR CARRYING OUT THE INVENTION

An embodiment of the present invention will now be described in detail with reference to the attached drawings.

Microplasma jet generators (hereinafter simply referred to as "plasma chips") 10, 20, and 30 shown in FIGS. 1(*a*) to 1(*c*) include substrates 1; micro-antennas 2*a*, 2*b*, and 2*c* (FIG. 1(*a*) shows a two-turn antenna, FIG. 1(*b*) shows a three-turn antenna, and FIG. 1(*c*) shows a four-turn antenna), respectively, disposed on the substrates 1; and discharge tubes 3 extending in the substrates 1. In the present invention, it is critical that the micro-antennas 2*a*, 2*b*, and 2*c* have a flat meandering shape with plural turns. The micro-antennas 2*a*, 2*b*, and 2*c* preferably have two to four turns, and more preferably four turns. Since the micro-antennas have such a meandering shape, the plasma chips have higher performance and are capable of more stably generating microplasma jets in microspaces at atmospheric pressure as compared to a plasma chip, disclosed in Patent Document 1, including a one-turn antenna having a meandering shape.

As shown in FIGS. 1(*a*) to 1(*c*), the micro-antennas 2*a*, 2*b*, and 2*c* are preferably located close to respective microplasma jet-generating end portions of the substrates 1. This is because the smaller the distance between each micro-antenna and plasma generated by driving a VHF power supply, the higher the electron density of the plasma. The electron density distribution of the plasma can be determined from the Stark broadening of the $H_\beta$ line of hydrogen slightly contained in the plasma.

The micro-antennas 2*a*, 2*b*, and 2*c* each include a plating layer 6 which is preferably made of a conductive metal and more preferably copper, gold, or platinum or which includes sublayers made of these metals. The thickness of the plating layer 6 is preferably at least two times greater than the depth (δ) below the surface of the conductive metal at which a high-frequency current flows, the depth being represented by the following equation:

$$\delta=(2/(\omega\mu\sigma))^{1/2}$$

wherein σ represents the conductivity of the conductive metal, μ represents the magnetic permeability thereof, and ω represents the angular frequency of the high-frequency current. When the plating layer 6 is made of, for example, copper and the frequency of the high-frequency current is 100 MHz, the critical thickness of the plating layer 6 is about 100 μM.

In order to stably generate high-density microplasma jets, the micro-antennas 2*a* to 2*c* with such a meandering shape preferably have a length of 2 to 10 mm and a thickness (width) of 0.5 to 2 mm.

In the present invention, the substrates 1 are preferably made of an insulating material with high heat conductivity. Preferable examples of the insulating material include alumina, sapphire, aluminum nitride, silicon nitride, boron nitride, and silicon carbide. Alumina is particularly preferable.

The discharge tubes 3 preferably extend in the substrates such that the discharge tubes 3 are located directly below meandering portions of the micro-antennas 2*a* to 2*c*. However, the discharge tubes 3 need not be necessarily integrated with the plasma chips 10, 20, and 30 and the positions of the discharge tubes 3 may be varied depending on the purpose of microplasma. In order to stably generate the high-density microplasma jets, the discharge tubes 3 preferably have a cross-sectional area of 0.01 to 10 $mm^2$.

Each plasma chip, described above, according to the present invention can be manufactured by a known photo lithographic process or the like. A procedure for manufacturing the plasma chip will now be described with reference to FIG. 2. As shown in FIG. 2(*a*), a resist mask 5 with an opening 4 having the same shape as that of one of the micro-antennas is formed on each substrate 1. As shown in FIG. 2(*b*), the substrate 1 is plated with a metal material 6 for forming the micro-antennas by RF magnetron sputtering. In this step, a chromium layer serving as an adhesive layer is formed as required. As shown in FIG. 2(*c*), lift-off is performed, whereby a metal layer 6 having an antenna shape is allowed to remain and an antenna-shaped section is formed by electroplating so as to have a desired thickness. As shown in FIG. 2(*d*), in order to seal the discharge tube 3 extending in the substrate 1, a plate 7 made of the same material as that of the substrate is bonded to the rear face of the substrate 1.

The discharge tube may be formed in such a manner that an insulating tube such as an alumina tube is bonded to the substrate having the corresponding micro-antenna.

Plasma gas is introduced into each plasma chip manufactured as described above. The flow rate of the plasma gas is preferably 0.05 to 5 slm and more preferably 0.5 to 2 slm. A VHF wave is applied to the micro-antenna from a VHF power supply (high-voltage generator) via a matching circuit, whereby a plasma jet can be stably generated. Preferable examples of the plasma gas include argon, neon, and helium. Alternatively, a gas mixture of one of these gases and hydrogen, oxygen, or nitrogen may be used.

The generator and a method according to the present invention are suitable for chemical microanalysis and particularly suitable for chemical microanalysis using micro-capillary electrophoresis.

The generator and method of the present invention are useful in subjecting a predetermined region of a workpiece to surface treatment or processing such as cutting, etching, film deposition, cleaning, or hydrophilization.

In a processing or surface treatment method, using the microplasma jet generator according to the present invention, a unit for introducing reactive gas needs to be located close to a microplasma jet source. The reactive gas is preferably oxygen, nitrogen, air, carbon fluoride, or sulfur hexafluoride. The reactive gas may be fed through a ring-shaped nozzle placed close to an outlet of a plasma source.

If, for example, a silicon wafer is etched in such a manner that the wafer is placed too close to or far from the plasma source, the depth of an etched portion of the wafer is apt to be small. An increase in the flow rate of the reactive gas increases the depth of the etched portion. However, if the flow rate thereof exceeds a certain level, plasma disappears. This leads to a reduction in the depth of the etched portion. The etching rate obtained by moving the plasma source is substantially the same as that obtained by fixing the plasma source. However, if the moving speed of the plasma source exceeds a certain level, the etching rate is apt to be small. This is probably because the local heating of the wafer by plasma affects etching.

EXAMPLES

The present invention will now be further described with reference to examples.

Manufacture Example 1

Plasma chips were manufactured according to the procedure shown in FIG. 2. In the step shown in FIG. 2(*a*), each resist mask 5 with an opening 4 for forming a two-turn micro-antenna was formed on an alumina substrate 1 (a length of 15 mm and a width of 30 mm). In this step, the opening 4 was formed close to a microplasma jet-generating end portion of each plasma chip. This allowed a high-density plasma jet to be generated at a portion of the micro-chip that is located close to the plasma antenna. The substrate 1 had a recessed section (a depth of 1 mm, a width of 1 mm, and a length of 30 mm), formed in the rear face thereof in advance, for forming a discharge tube.

In the step shown in FIG. 2(*b*), the following sublayers were formed by RF magnetron sputtering: a Cr sublayer, having a thickness of about 500 Å, serving as an adhesive layer between the substrate and a Cu sublayer and then the Cu sublayer, having a thickness of about 1000 Å, serving as a seed layer in a subsequent electroplating step. In the step shown in FIG. 2(*c*), lift-off was performed, whereby a layer 6 including the Cr sublayer and the Cu sublayer was allowed to remain in an antenna-shaped section. A Cu layer with a thickness of 50 to 200 μm was deposited on the antenna-shaped section by electroplating. Finally, in the step shown in FIG. 2(*d*), in order to seal the discharge tube 3, an alumina plate 7 was bonded to the rear face of the chip, whereby each plasma chip was manufactured.

Manufacture Example 2

A plasma chip was manufactured in substantially the same manner as that described in Manufacture Example 1 except that a quartz substrate was used instead of the alumina substrate.

Manufacture Examples 3 and 4

Two plasma chips were manufactured in substantially the same manner as that described in Manufacture Example 1 except that these plasma chips each included a three-turn micro-antenna as shown in FIG. 1(*b*) or a four-turn micro-antenna as shown in FIG. 1(*c*).

Test Example 1

Test for Measuring Temperature Changes in Micro-Antennas Disposed on Substrates made of Different Materials A difference in heat dissipation between one of the plasma chips of Manufacture Example 1 and the plasma chip of Manufacture Example 2 was visualized with a thermographer (CPA-7000, available from FLIR Systems) in such a manner that plasma was generated from each plasma chip with an electric power of 5, 10, 20, or 50 W. This showed that an increase in electric power increased the temperature of the antennas each disposed on the quartz or alumina substrate because of Joule heating. The comparison in in-plane temperature distribution between the chips showed that the temperature around the antenna disposed on the quartz substrate was sharply increased with an increase in electric power and the temperature of the chip including the alumina substrate was uniformly increased. This shows that the alumina substrate is superior in heat dissipation to the quartz substrate.

FIG. 3 is a graph showing the relationship between the electric power and the temperature of the antennas disposed on the substrates, made of different materials, included in the plasma chips of Manufacture Examples 1 and 2. The temperature of the antenna disposed on the quartz substrate more sharply increases with an increase in the applied electric power as compared to that of the antenna disposed on the alumina substrate. In usual, the electric power input to plasma is given by the following equation:

$$P_{plasma}=(R_{plasma}/(R_{plasma}+R_{system}))(P_f-P_r)$$

wherein $P_{plasma}$ represents the electric power input to the plasma, $R_{plasma}$ represents the plasma resistance, $R_{system}$ represents the system resistance, $P_f$ represents the forward power, and $P_r$ represents the reflected power. Since the heat dissipation of the alumina substrate is about 15 times greater than that of the quartz substrate, the temperature of the copper antenna disposed on the alumina substrate is less increased and the resistance thereof is therefore less increased as compared to those of the antenna disposed on the quartz substrate. Hence, the plasma chip including the alumina substrate is suitable for a microplasma jet generator including no cooling unit.

Test Example 2:

Test for Evaluating Dependency of Ar Emission Intensity on Electric Power Using Substrates Made of Different Materials FIG.4 is a schematic view of an apparatus for measuring the emission intensity of argon. Argon was introduced into a discharge tube 3 present in a substrate 1 through a pipe 8. A high-frequency wave with a frequency of 144 MHz wa generated by varying an electric power using a high-frequency electric current provided by a high voltage-generating unit PU and a matching circuit and then applied to a micro-antenna, whereby plasma P was generated. The plasma P was measured for argon emission intensity with a spectrometer using an optical fiber 9. The emission intensity of the 763 nm line in the Ar I spectrum was measured at an argon flow rate of 0.7 slm at a position 2 mm distant from an end portion of the micro-antenna. FIG. 5 shows the relationship between the emission intensity of argon and the electric power applied to the plasma chips, manufactured in Manufacture Example 1 or 2, including the substrates made of different materials.

FIG. 5 illustrates that one of the alumina substrates is more suitable for obtaining high emission intensity as compared to the quartz substrate. This shows that a material for forming a substrate is preferably an insulating material having high heat conductivity. Therefore, the alumina chips of Manufacture Example 1 were used in experiments below.

Test Example 3

Test for Evaluating Dependency of Ar Emission Intensity on Thickness of Cu Layer of Micro-Antenna The emission intensity of the 696, 706, 738, 750, 763, and 772 nm lines in the Ar I spectrum was measured at a position 2 mm distant from an end portion of each micro-antenna under the following conditions: an argon flow rate of 0.7 slm, a discharge time of ten minutes, a frequency of 144 MHz, and an electric power of 50 W. FIG. 6 shows the relationship between the thickness of the copper layers included in the antennas and the argon emission intensity of the wavelength lines in the Ar I spectrum.

FIG. 6 illustrates that the emission intensity of each wavelength line in the Ar I spectrum is low when the copper layers have a thickness of 100 μm or less and that the Ar I emission intensity thereof is constant when the copper layers have a thickness of 100 μm or more. A high-frequency current flowing in each antenna is prevented by a skin effect from flowing in a region that is apart from the surface of a conductor at a certain distance (referred to as the skin depth); hence, an increase in the copper layer thickness does not reduce the antenna resistance. The antennas including the copper layers having a thickness less than the skin depth have high resistance. This reduces the efficiency of the electric power input to plasma. The result of this experiment shows that a copper layer included in an antenna of this model needs to have a thickness of at least 100 μm.

Test Example 4

Test for Determining Change in Ar Emission Intensity with Time

The emission intensity of the 696, 706, 738, 750, 763, and 772 nm lines in the Ar I spectrum was measured at a position 2 mm distant from an end portion of each micro-antenna under the following conditions: an argon flow rate of 0.7 slm and an electric power of 50 W. In this measurement, discharge was started when the temperature of a matching circuit was equal to atmospheric temperature. FIG. 7 shows the relationship between the discharge time and the emission intensity of each wavelength line in the Ar I spectrum.

FIG. 7 illustrates that the emission intensity thereof decreases within five minutes after discharge is started. This is because the matching circuit used in this experiment included no cooling unit and therefore the following phenomenon occurred: the temperature of the circuit was increased due to Joule heating, the resistance of the circuit was therefore increased, and the electric power input to plasma was therefore reduced. FIG. 7 also illustrates that the Ar emission intensity thereof becomes constant five minutes later after discharge is started. This is because the temperature increase of the circuit was saturated and the electric power input to plasma therefore became constant.

Test Example 5

Test for Evaluating Dependency of Ar Emission Intensity on Flow Rate of Gas

The emission intensity of the 763 nm line in the Ar I spectrum was measured at a position 2 mm distant from an end portion of one of the micro-antennas with an electric power of 50 W. FIG. 8 shows the relationship between the emission intensity thereof and the flow rate of argon gas. FIG. 8 illustrates that the emission intensity is maximum at an argon gas flow rate of about 0.7 slm. Gas can be fed from a small-size gas cylinder at such a flow rate. This suggests that a portable microplasma jet generator can be manufactured.

Test Example 6

Test for Evaluating Dependency of Ar Emission Intensity on Electric Power Using Micro-Antennas Having Different Shapes Micro-antennas having a turn number of two, three, or four as shown in FIG. 1 were used and the emission intensity of the 763 nm line in the Ar I spectrum was measured at a position 2 mm distant from an end portion of each micro-antenna at an argon flow rate of 0.7 slm. FIG. 9 shows the dependency of the argon emission intensity thereof on the electric power.

The result of this experiment shows that an increase in the length of the micro-antennas extending above discharge tubes leads to an increase in emission intensity. However, there is no large difference in emission intensity, that is, plasma density, between the three-turn micro-antenna and the four-turn micro-antenna. An extreme increase in antenna length will probably cause a serious power loss. Hence, the four-turn micro-antenna is evaluated to be best.

Industrial Applicability

A microplasma jet generator according to the present invention is more compact than conventional ones and is suitable for μTAS because the microplasma jet generator is portable and useful in detecting a micro-sample. The microplasma jet generator can be used for "on-site analysis" such as analysis for the investigation of an accident, for example, the contamination of a water-purification plant with hazardous substances, analysis for the continuous monitoring of waste water from factories, emergency analysis performed at a site where food or chemical poisoning has occurred, or the analysis of polluted soil during land trading. Furthermore, if the microplasma jet generator, which is compact, is used for surface treatment or processing such as etching or film deposition, a microplasma jet source included in the microplasma jet generator can be readily moved and therefore more fine regions can be processed or surface-treated as compared to conventional generators.

BRIEF DESCRIPTION OF THE DRAWINGS

FIG. 1(*a*) showing a plasma chip including a two-turn antenna, FIG. 1(*b*) showing a plasma chip including a three-turn antenna, and FIG. 1(*c*) showing a plasma chip including a four-turn antenna.

REFERENCE NUMERALS

Figure 1A:
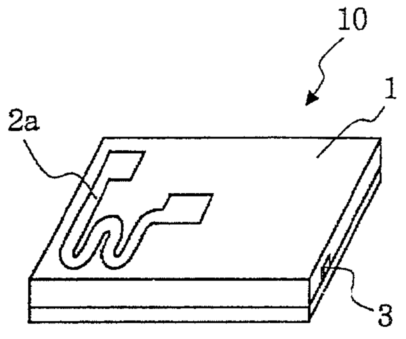
FIG. 1 includes perspective views.
Figure 1B:
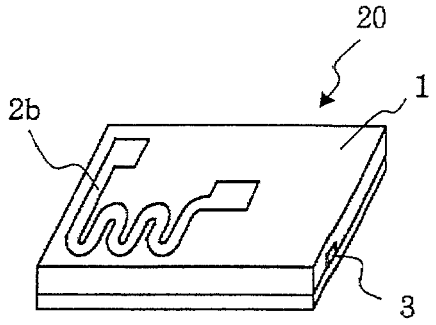
Figure 1C:
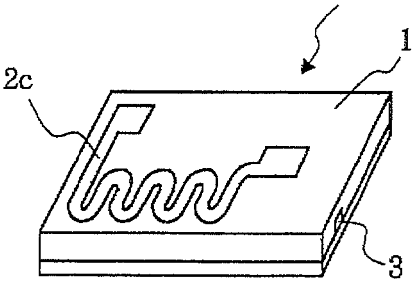
Figure 2A:
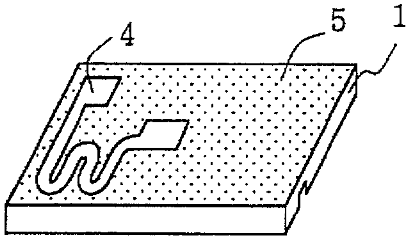
FIG. 2 is an illustration showing a procedure for manufacturing a plasma chip.
Figure 2B:
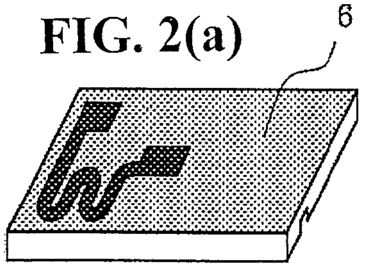
Figure 2C:
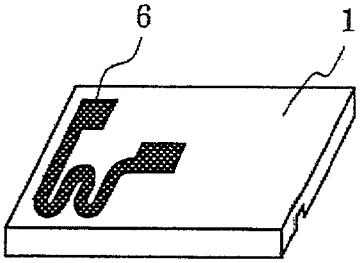
Figure 2D:
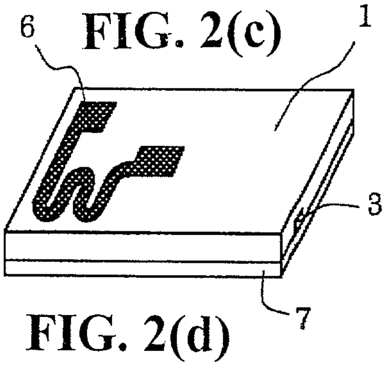
Figure 3:
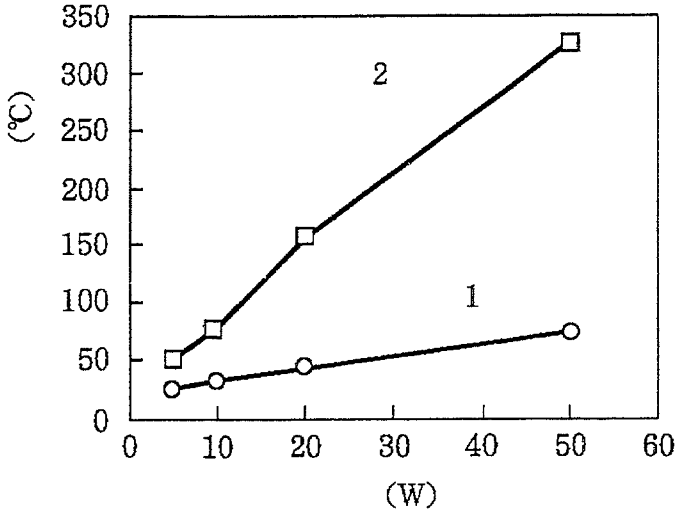
FIG. 3 is a graph showing the relationship between the electric power and the temperature of antennas disposed on substrates which are made of different materials and which are included in respective plasma chips.
Figure 4:
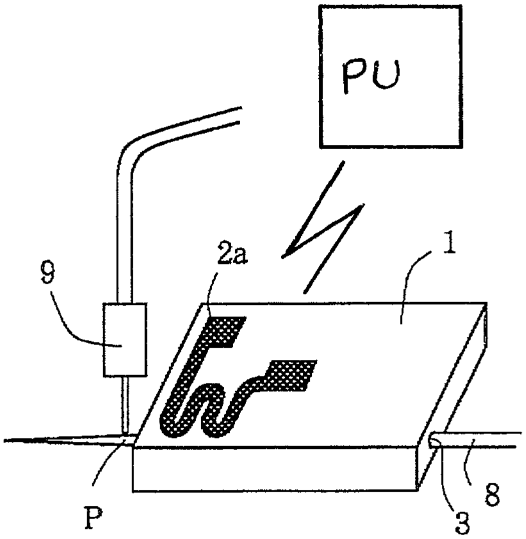
FIG. 4 is a schematic view showing a method for measuring the emission intensity of argon.
Figure 5:
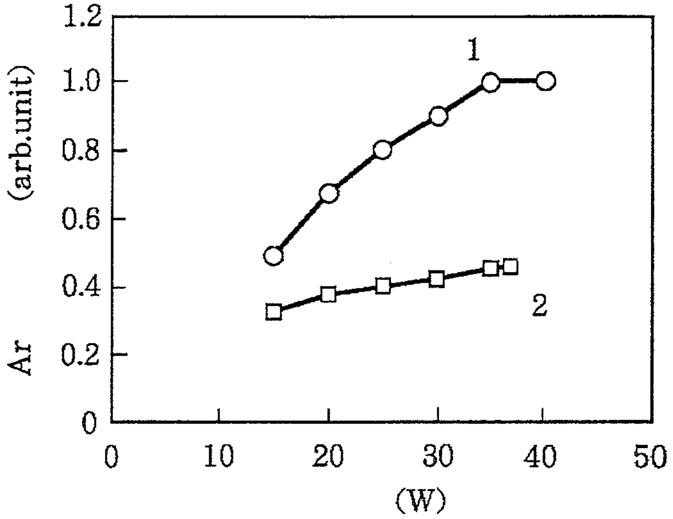
FIG. 5 is graph showing the relationship between the emission intensity of argon and the electric power applied to plasma chips including substrates made of different materials.
Figure 6:
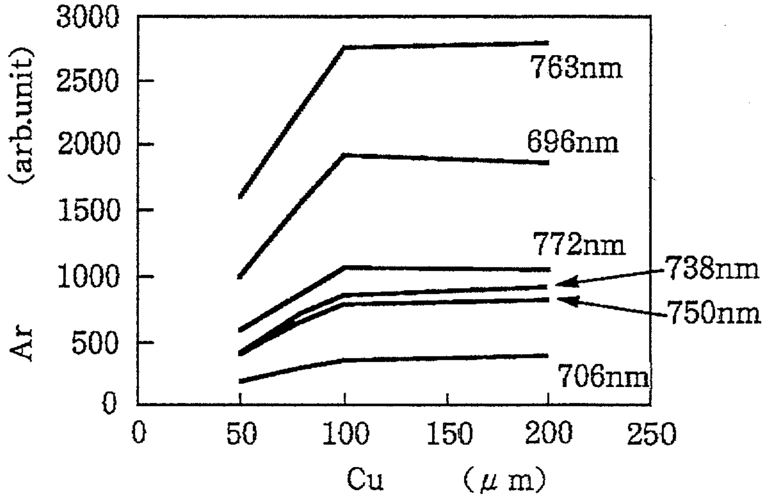
FIG. 6 is a graph showing the relationship between the thickness of cupper layers included in antennas and the emission intensity of each wavelength line in the Ar I spectrum.
Figure 7:
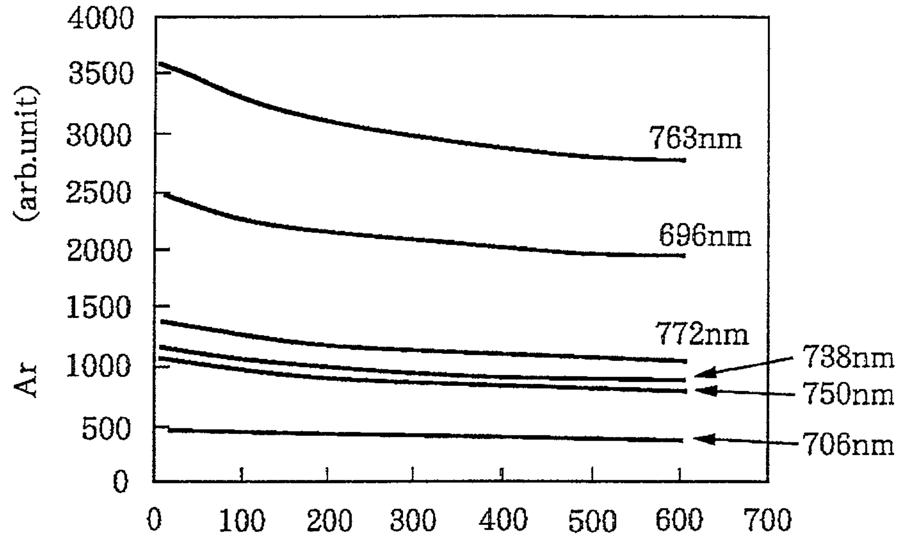
FIG. 7 is a graph showing the relationship between the discharge time and the emission intensity of each wavelength line in the Ar I spectrum.
Figure 8:
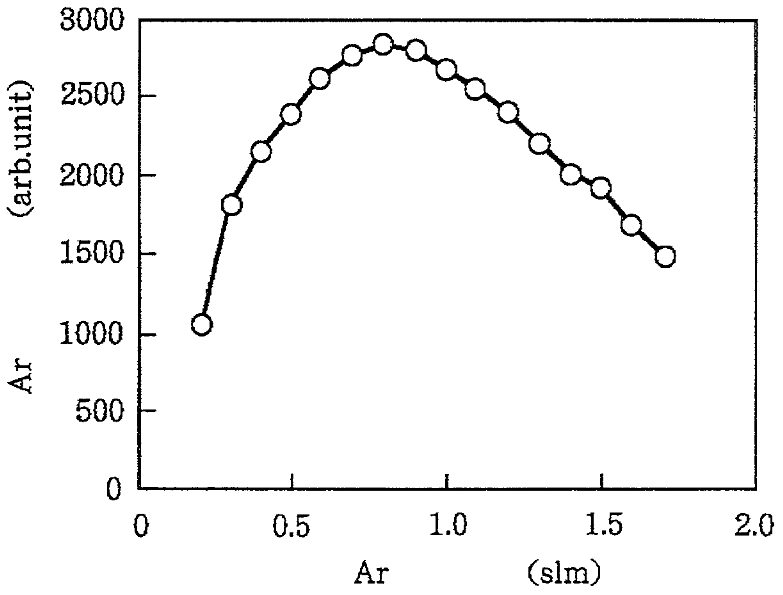
FIG. 8 is a graph showing the relationship between the emission intensity of argon and the flow rate of argon gas.
Figure 9:
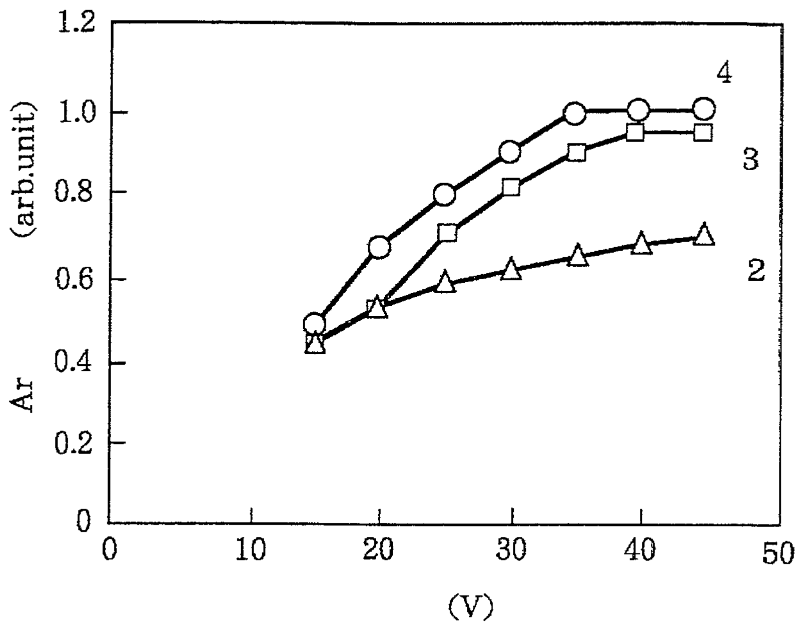
FIG. 9 is a graph showing the relationship between the turn number of antennas, the emission intensity of argon, and the electric power.
Figure 10:
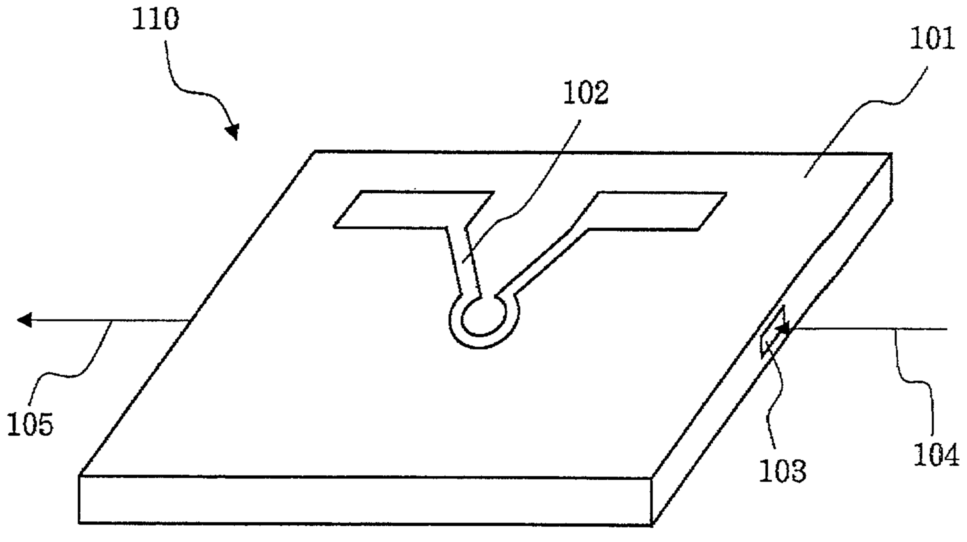
FIG. 10 is a perspective view of a conventional plasma chip.

1 and 101 substrates
2*a*, 2*b*, and 2*c* micro-antennas
3 and 103 discharge tubes
4 opening
5 resist mask
6 metal layer (metal material)
7 plate
8 pipe
9 optical fiber
10, 20, and 30 plasma chips
102 one-turn flat antenna
104 plasma gas
105 microplasma jet
110 microplasma chip

The invention claimed is:

1. A microplasma jet generator, driven with a VHF electric current, for generating an inductively coupled microplasma jet, the microplasma jet generator comprising:
- a substrate,
- a micro-antenna disposed on the substrate,
  - the micro-antenna having a flat meandering shape extending continuously from a first end to a second end thereof, and being configured to include:
    - at least two U-shaped portions, each of which is provided with a first curved portion which turns substantially 180° and opens in a first direction, and two substantially straight and parallel sides extending respectively from opposite ends of the first curved portion,
    - wherein each adjacent pair of the least two U-shaped portions is joined together by a second curved portion which turns substantially 180° and opens in a second direction which is opposite to the first direction of the first curved portion of each of the U-shaped portions, and
- a discharge tube located close to the micro-antenna.

2. The microplasma jet generator according to claim 1, wherein the micro-antenna is located close to a microplasma jet-generating end portion of the substrate, and
- the discharge tube is formed as a linear-shaped trough cut into a surface of the substrate opposite to a surface of the substrate where the micro-antenna is disposed.

3. The microplasma jet generator according to claim 1, wherein the micro-antenna includes a plating layer which is made of copper, gold, or platinum or which includes sublayers made of these conductive metals.

4. The microplasma jet generator according to claim 3, wherein the thickness of the plating layer is at least two times greater than the depth (δ) below the surface of the conductive metal at which the VHF electric current flows, the depth being represented by the following equation:

$$\delta=(2/(\omega\mu\sigma))^{1/2}$$

wherein σ represents the conductivity of the metal, μ represents the magnetic permeability thereof, and ω represents the angular frequency of the high-frequency current.

5. The microplasma jet generator according to claim 1, wherein the substrate is made of one selected from the group consisting of alumina, sapphire, aluminum nitride, silicon nitride, boron nitride, and silicon carbide.

6. The microplasma jet generator according to claim 5, wherein the substrate is made of alumina,
- the substrate has first and second flat surfaces parallel to each other,
- the micro-antenna is disposed on the first flat surface, and
- the discharge tube is formed as a trough in the second flat surface, and
- a plate is bonded to the second flat surface of the substrate, thereby sealing the discharge tube.

7. The microplasma jet generator according to claim 1, wherein the VHF electric current is provided by a high voltage-generating unit.

8. A method for generating a microplasma jet, comprising introducing plasma gas into the microplasma jet generator according to claim 1 at a flow rate of 0.05 to 5slm and applying a VHF wave to the micro-antenna.

9. A chemical microanalysis method comprising using the microplasma jet generator according to claim 1.

10. The chemical microanalysis method according to claim 9, further comprising using micro-capillary electrophoresis.

11. A method for processing or surface treatment, comprising using the microplasma jet generator according to claim 1.

12. The method according to claim 11, wherein the processing or the surface treatment is the cutting of a predetermined portion of a workpiece, etching, film deposition, cleaning, or hydrophilization.

13. The method according to claim 11, further comprising using a unit, located close to a microplasma jet source included in the microplasma jet generator, for introducing reactive gas.

14. The method according to claim 13, wherein the reactive gas is one selected from the group consisting of oxygen, nitrogen, air, carbon fluoride, and sulfur hexafluoride.

15. The microplasma jet generator according to claim 1, wherein a length of the micro-antenna being 2 to 10 mm, and a thickness of the micro-antenna being 0.5 to 2 mm.

16. The microplasma jet generator according to claim 1, wherein the micro-antenna includes four of the U-shaped portions.

17. A microplasma jet generator, driven with a VHF power supply, for generating an inductively coupled microplasma jet, the microplasma jet generator comprising:
- a substrate with an upper surface which is substantially flat,
- a micro-antenna disposed on a surface of the substrate,
  - the micro-antenna having a flat meandering shape extending continuously from a first end to a second end thereof, and being configured to include:
  - at least two U-shaped portions, each of which is provided with a first curved portion which turns substantially 180° and opens in a first direction, and two substantially straight and parallel sides extending respectively from opposite ends of the first curved portion,
  - wherein each adjacent pair of the least two U-shaped portions is joined together by a second curved portion which turns substantially 180° and opens in a second direction which is opposite to the first direction of the first curved portion of each of the U-shaped portions, and
- a discharge tube located close to the micro-antenna.

18. The microplasma jet generator according to claim 17, wherein the micro-antenna includes at least three of the U-shaped portions.

* * * * *